(12) United States Patent
Inoue et al.

(10) Patent No.: US 7,196,285 B2
(45) Date of Patent: Mar. 27, 2007

(54) STRUCTURE FOR MANAGING UMBILICAL MEMBER OF WELDING TORCH IN ARC WELDING ROBOT

(75) Inventors: Toshihiko Inoue, Fujiyoshida (JP); Kazutaka Nakayama, Minamitsuru-gun (JP); Tomoyuki Motokado, Minamitsuru-gun (JP)

(73) Assignee: Fanuc Ltd, Yamanashi (JP)

( * ) Notice: Subject to any disclaimer, the term of this patent is extended or adjusted under 35 U.S.C. 154(b) by 80 days.

(21) Appl. No.: 11/085,036

(22) Filed: Mar. 22, 2005

(65) Prior Publication Data

US 2005/0211686 A1    Sep. 29, 2005

(30) Foreign Application Priority Data

Mar. 23, 2004  (JP) ............................ 2004-084917

(51) Int. Cl.
*B23K 9/32* (2006.01)
(52) U.S. Cl. ...................... 219/137.9; 901/42
(58) Field of Classification Search ............ 219/125.1, 219/137.9; 901/42
See application file for complete search history.

(56) References Cited

U.S. PATENT DOCUMENTS 6,578,800 B2 *  6/2003  Stefan .................... 248/52

2001/0052564 A1  12/2001  Karlinger ................... 248/74.1
2005/0150883 A1 *  7/2005  Tomiyasu et al. ........ 219/137.9

FOREIGN PATENT DOCUMENTS

| DE | 101 41 407 | 10/2002 |
| JP | 5-28563 | 4/1993 |
| JP | 2003-230963 | 8/2003 |
| WO | WO 03/066267 | * 8/2003 |

* cited by examiner

*Primary Examiner*—Kevin P. Kerns
(74) *Attorney, Agent, or Firm*—Drinker Biddle & Reath LLP

(57) ABSTRACT

An umbilical-member managing structure for a welding torch in an arc welding robot. The umbilical members include a welding wire fed to the welding torch, a tubular liner surrounding the welding wire, a tube for supplying an assist gas to the welding torch, and an electrical conductor for feeding a welding current to the welding torch. The arc welding robot is provided with a wire feeding device mounted on the manipulator for feeding the welding wire to the welding torch. The umbilical-member managing structure includes a flexible conduit containing the umbilical members, which includes a first connecting section provided at one longitudinal end connected to the welding torch, and a second connecting section provided at another longitudinal end connected to the wire feeding device; and a connection mechanism for rotatably connecting the conduit to at least one of the welding torch and the wire feeding device.

3 Claims, 8 Drawing Sheets

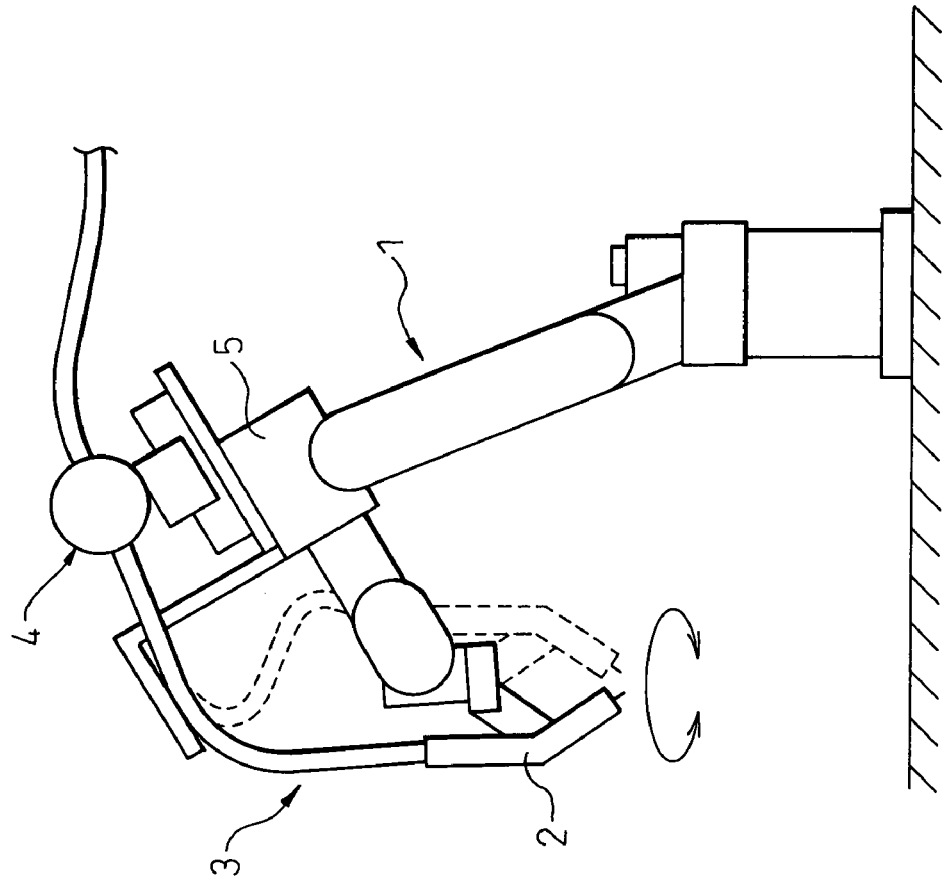
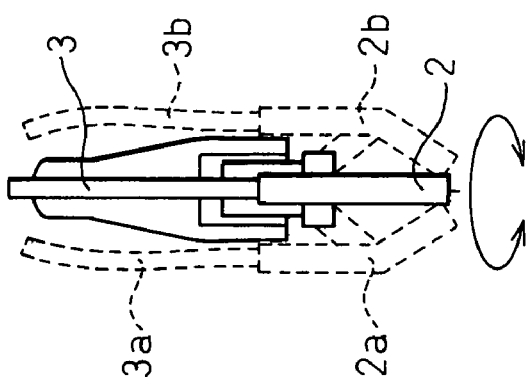

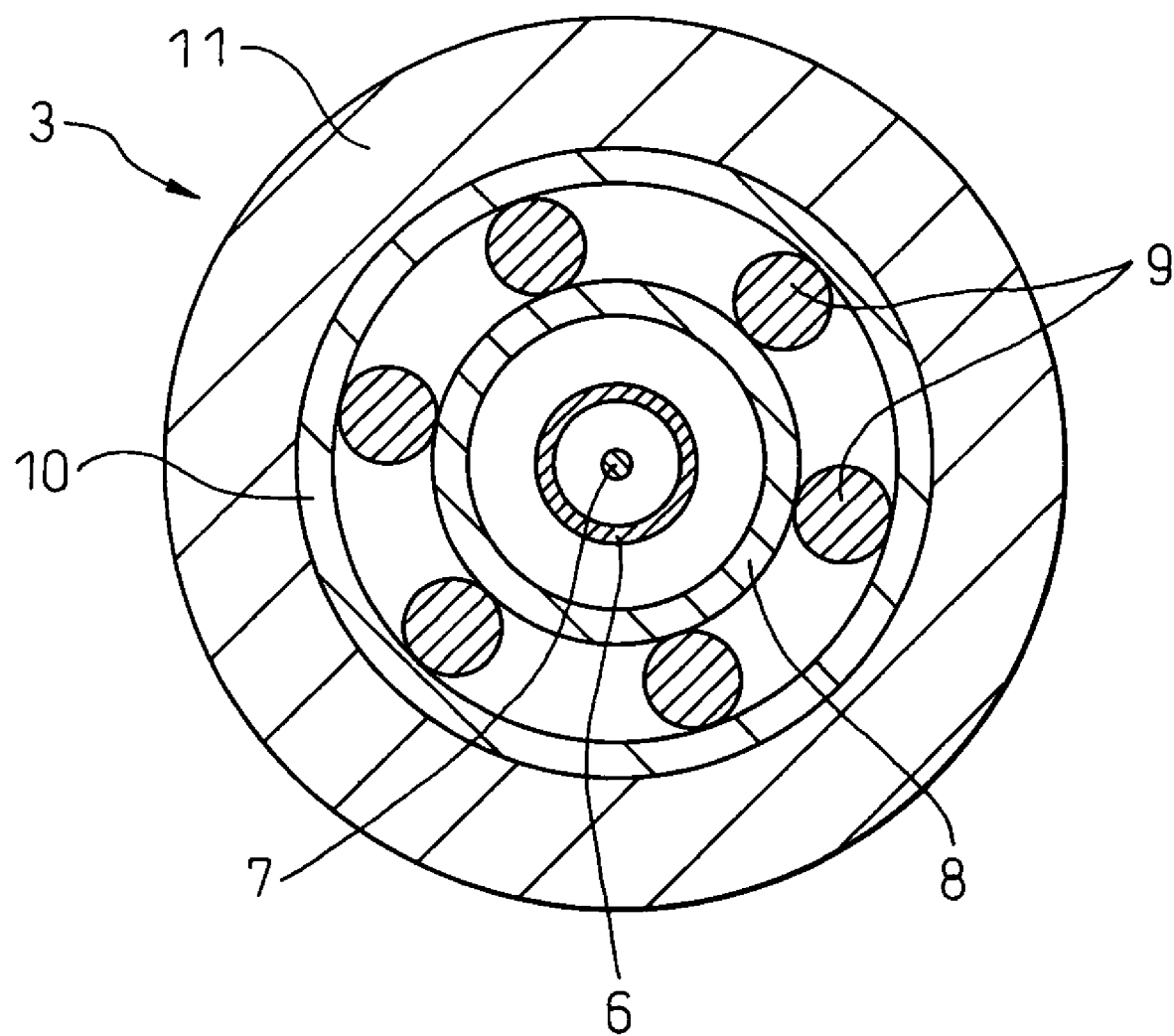

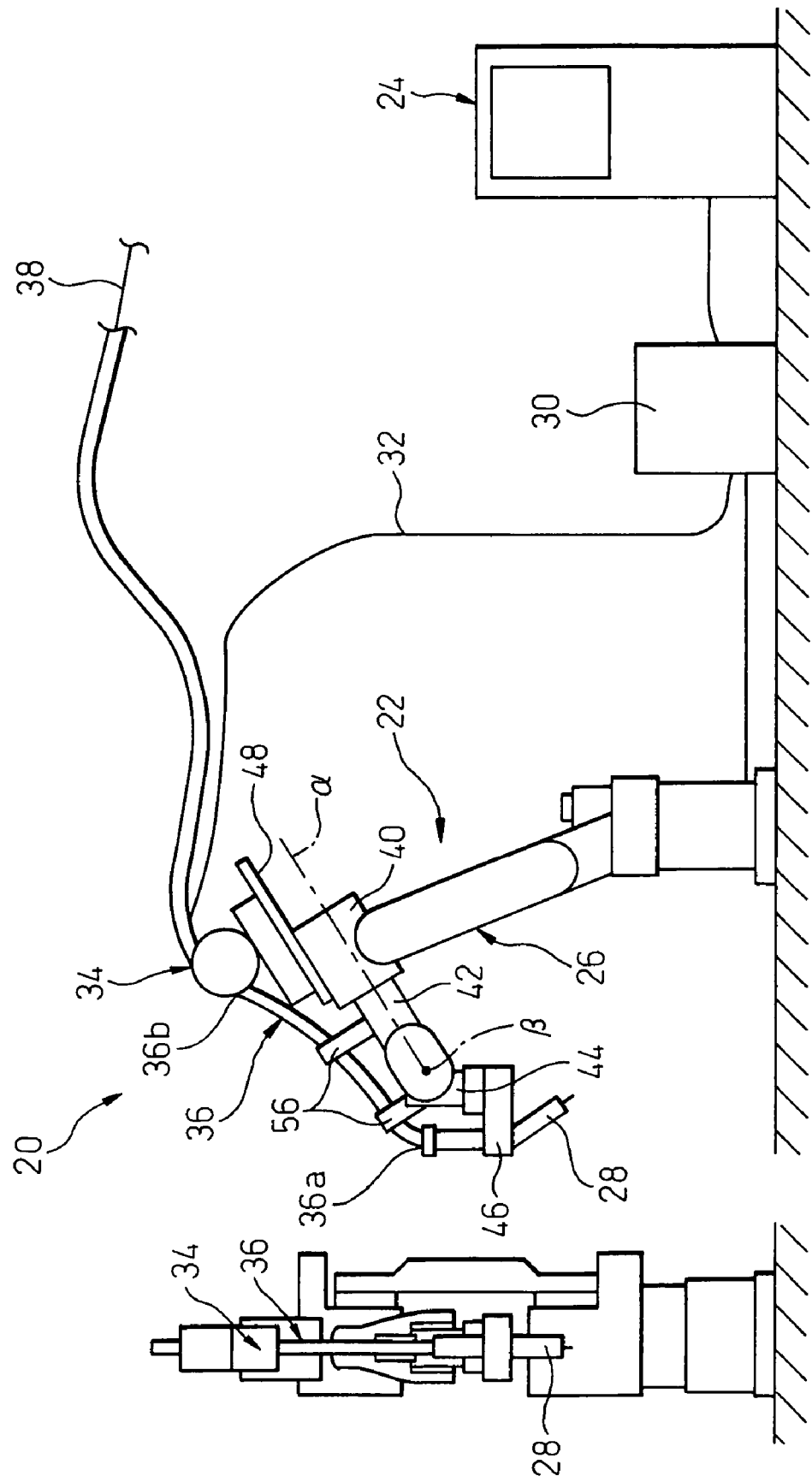

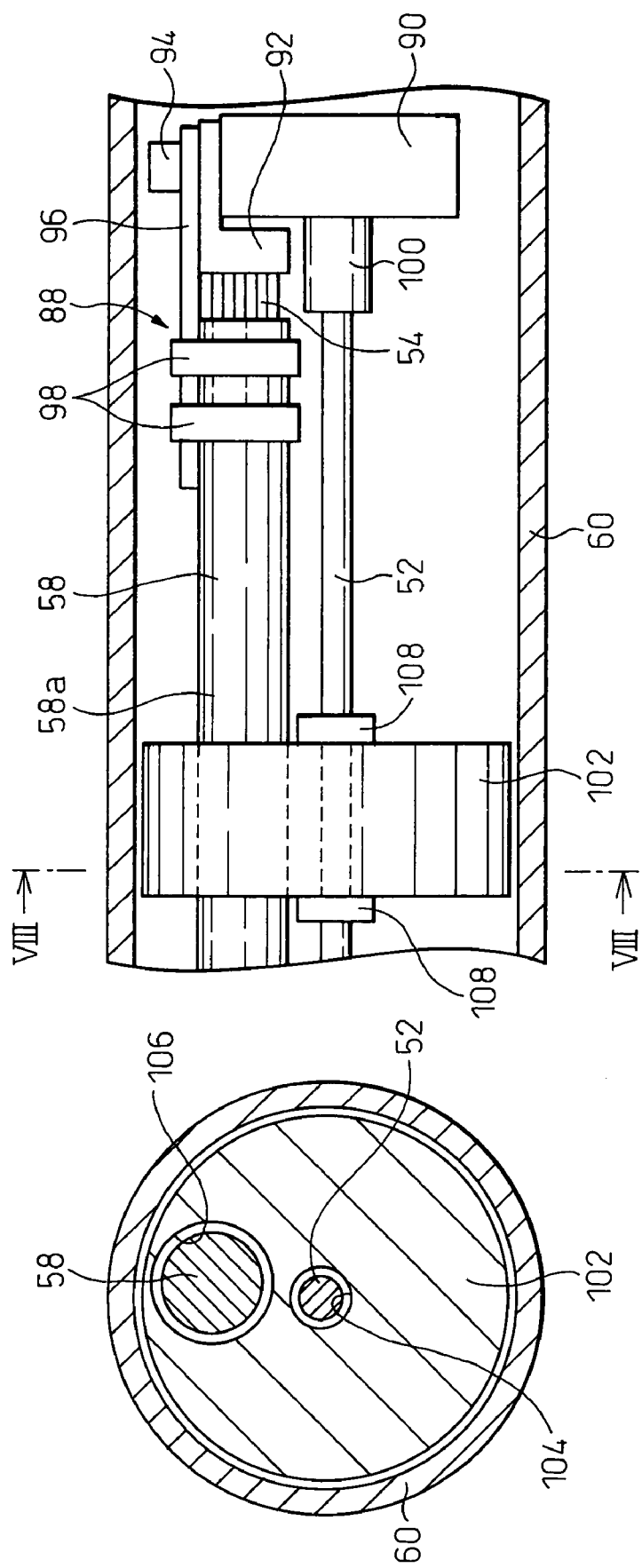

STRUCTURE FOR MANAGING UMBILICAL MEMBER OF WELDING TORCH IN ARC WELDING ROBOT

BACKGROUND OF THE INVENTION

1. Field of the Invention

The present invention relates to a structure for managing an umbilical member of a welding torch in an arc welding robot.

2. Description of the Related Art

In a conventional arc welding robot, a configuration has been known in which a welding torch is attached to the distal end of a forearm of the robot, and a wire feeding device is provided on the forearm so as to feed a welding wire, through a torch cable, to the welding torch. FIG. 1A is a front view schematically showing the configuration of this type of arc welding robot, and FIG. 1B is a side view showing a portion around the welding torch of the arc welding robot as seen from the left side of FIG. 1A. As shown in FIG. 1A, in this arc welding robot, a welding torch 2 is attached to the distal end of an arm (or a forearm) of a robot mechanical section 1, and a wire feeding device 4 is mounted on a support base 5 of the robot arm (forearm). A torch cable 3 is laid between the wire feeding device 4 and the welding torch 2. In this connection, Japanese Unexamined Utility Model Publication (Kokai) No. 5-28563 (JP 5-28563 U) discloses an arc welding robot having the illustrated configuration.

It is required to supply, in addition to the welding wire, an assist gas and a welding current to the welding torch 2, and thus the torch cable 3 contains a plurality of umbilical members such as a gas pipe, an electric wire, etc. for feeding them. In general, the welding wire is fed to be passed through a tubular welding-wire liner, and the assist gas is supplied to flow in a tube. For supplying the welding current, several linear electrical conductors are used.

Thus, the torch cable 3 containing various umbilical members is subjected to a large load as the robot mechanical section 1 operates. For example, when a wrist axis of the robot mechanical section performs an orientation change (i.e., a turning) of the welding torch 2, the posture of the torch cable 3 changes to a large extent, as shown by broken lines 3a, 3b in FIG. 1B, due to the turning motion of the welding torch 2 (see broken lines 2a, 2b), so that the torch cable 3 is subjected to a bending or twisting action. In this connection, a cable structure (i.e., an umbilical-member managing structure) for reducing the load on the torch cable 3 has been proposed (see FIG. 2), as disclosed in Japanese Unexamined Patent Publication (Kokai) No. 2003-230963 (JP 2003-230963 A).

In the illustrated cable structure, a tubular liner (i.e., a conduit liner) 6 is disposed at the center of the torch cable 3, and the internal space of the liner 6 is used as a passage for a welding wire 7. The liner 6 is accommodated within a gas hose 8 for flowing an assist gas therethrough, and two or more (typically several) electrical conductors 9 are disposed on the outside of the gas hose 8. The electrical conductors 9 are arranged side-by-side along the outer circumference of the gas hose 8 so as to be spaced from each other, and a retainer tape 10 is wound around them from the outside thereof. Then, a sheath 11 is provided outside the retainer tape 10.

In the conventional cable structure as described above, the plural electrical conductors 9 are arranged to be spaced from each other, so that, when a deformation such as bending or twisting is generated in the torch cable 3, the electrical conductors 9 can individually move in a direction as to avoid the deformation such as bending or twisting. Therefore, the fatigue of the electrical conductors 9 due to deformation can be reduced.

A conventional torch cable has a structure, as does the cable structure as described above, in which a plurality of umbilical members, including a liner used for a welding wire, a tube for feeding an assist gas and plural electrical conductors for feeding a welding current, are contained together within a single cable having an outer diameter reduced to as small as possible, for the purpose of reducing a material cost and a radial dimension. As a result, the torch cable has a significantly low flexibility.

The low flexibility of the torch cable gives an unfavorable result in a case where it is used in an arc welding robot having a wire feeding device mounted on a forearm. As described above, in an arc welding robot, a welding torch moves freely as a wrist section operates, so that a torch cable is repeatedly subjected to bending or twisting. Therefore, if the torch cable with low flexibility is used, it is difficult to prevent premature cable breakage even when the torch cable has the cable structure as shown in FIG. 2. In particular, in a case where the torch cable is laid near the forearm or the wrist of the robot in order to avoid interference between the cable and a workpiece to be welded or a jig, a reduced length and a reduced radius of curvature are provided for a portion of the torch cable between the wire feeding device and the welding torch, so that a stress exerted upon the torch cable, due to bending or twisting, becomes large and this may shorten the life of the torch cable.

SUMMARY OF THE INVENTION

It is an object of the present invention to provide an umbilical-member managing structure for a welding torch in an arc welding robot, which can prevent the life of a torch cable containing a plurality of umbilical members, including a welding-wire liner, an assist-gas tube and a welding-current electrical conductor, from being reduced.

It is another object of the present invention to provide an umbilical-member managing structure for a welding torch in an arc welding robot, which makes it possible to arrange a torch cable containing a plurality of umbilical members in close proximity to the forearm or the wrist of the robot, for the purpose of avoiding interference between the cable and a workpiece to be welded or a jig.

In order to accomplish the above objects, the present invention provides an umbilical-member managing structure for a welding torch provided in an arc welding robot, for laying and managing, along a manipulator, a plurality of umbilical members connected to a welding torch attached to the manipulator; wherein the plurality of umbilical members include a welding wire to be fed to the welding torch, a tubular liner surrounding the welding wire, a tube for supplying an assist gas to the welding torch, and an electrical conductor for feeding a welding current to the welding torch; wherein the arc welding robot is provided with a wire feeding device mounted on the manipulator for feeding the welding wire to the welding torch; and wherein the umbilical-member managing structure comprises a flexible conduit containing the plurality of umbilical members, the flexible conduit including a first connecting section provided at one longitudinal end to be connected to the welding torch, and a second connecting section provided at another longitudinal end to be connected to the wire feeding device; and a connection mechanism provided for at least one of the first and second connecting sections of the conduit, the connection mechanism connecting the conduit in a rotatable manner to at least one of the welding torch and the wire feeding device.

In the above umbilical-member managing structure, the conduit may contain the electrical conductor for welding current, in a condition as to be separated from both of the tubular liner for welding wire and the tube for assist gas.

Also, the above umbilical-member managing structure may further comprise a clamp mechanism provided in association with at least one of the first and second connecting sections of the conduit, the clamp mechanism clamping the plurality of umbilical members relative to at least one of the welding torch and the wire feeding device.

Also, the above umbilical-member managing structure may further comprise a retaining member provided in an interior of the conduit, the retaining member retaining the plurality of umbilical members at a predetermined position.

BRIEF DESCRIPTION OF THE DRAWINGS

The above and other objects, features and advantages of the present invention will become more apparent from the following description of preferred embodiments in connection with the accompanying drawings, wherein:

FIG. 1A is a front view schematically showing a mechanical section of a prior-art arc welding robot;

FIG. 1B is a side view showing a portion around a welding torch of the robot mechanical section of FIG. 1A;

FIG. 2 is a sectional view showing a prior-art cable structure used for a welding torch;

FIG. 3A is a front view schematically showing an entire configuration of an arc welding robot, in which an umbilical-member managing structure for a welding torch, according to an embodiment of the present invention, is used;

FIG. 3B is a side view schematically showing a mechanical section of the arc welding robot of FIG. 3A;

FIG. 8A is a partially cutaway view showing an umbilical-member retaining member provided within the torch cable, in the umbilical-member managing structure of FIG. 3A; and FIG. 8B is a sectional view taken along a line VIII—VIII of FIG. 8A.

DETAILED DESCRIPTION

Figure 4:
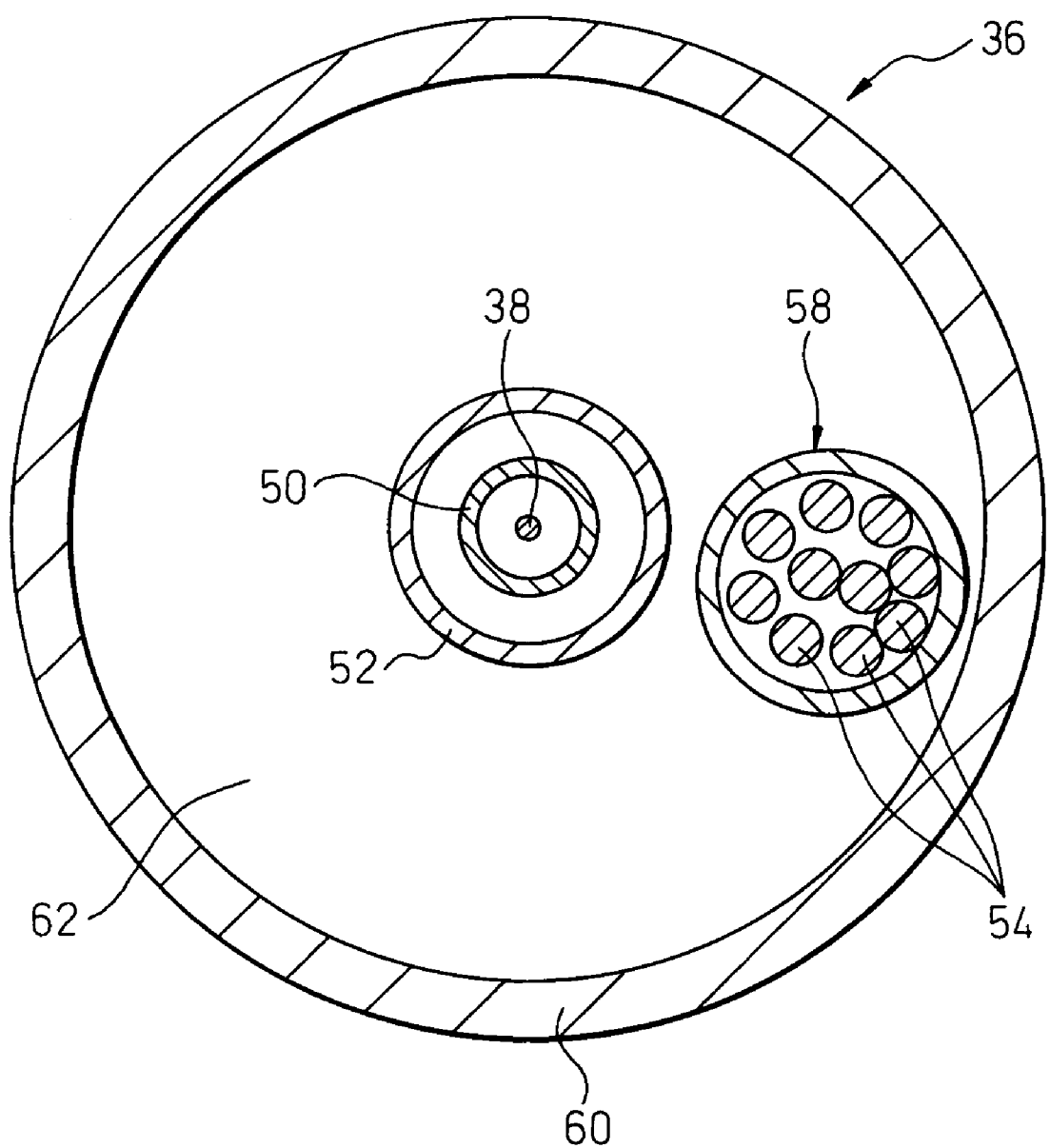
FIG. 4 is a sectional view showing the internal structure of a torch cable used for the umbilical-member managing structure of FIG. 3A.

The embodiments of the present invention are described below, in detail, with reference to the accompanying drawings. In the drawings, the same or similar components are denoted by common reference numerals.

Referring to the drawings, FIGS. 3A and 3B respectively show, as front and side views, the entire configuration of an industrial arc welding robot, in which an umbilical-member managing structure 20 for a welding torch, according to an embodiment of the present invention, is used. The illustrated arc welding robot includes a mechanical section 22 having six degrees of freedom, and a robot controller 24 for controlling the axes of the mechanical section 22. The mechanical section 22 includes a robot arm or manipulator 26 having a wrist (as described later), and a welding torch 28 is attached, as a working tool (i.e., an end effector), to the wrist of the manipulator 26. The mechanical section 22 operates to shift the welding torch 28 attached to the distal end of the wrist to a target position while keeping a designated orientation, in accordance with a command issued from the robot controller 24, so as to make the welding torch follow a join in an object to be welded. To this end, servo-motors (not shown), provided for the six axes of the mechanical section 22, are connected to and controlled by the robot controller 24 through a control cable (not shown). In this connection, the umbilical-member managing structure for a welding torch, according to the present invention, may be applied, not only to the illustrated vertically articulated robot having a six-axes configuration, but also to a vertically articulated robot having another configuration such as a five-axes configuration.

The arc welding robot as illustrated further includes a welding power supply 30 for carrying out a welding operation by the welding torch 28. The robot controller 24 also issues a welding command to the welding power supply 30 simultaneously with an operation command to the servo-motor of each axis of the mechanical section 22. The welding power supply 30 is connected through a feeder cable 32 to a wire feeding device 34 provided on the manipulator 26. The wire feeding device 34 supports a torch cable 36 connected to the welding torch 28 on the manipulator 26, and operates to feed a welding wire 38 delivered from a not-shown welding-wire drum toward the welding torch 28 through the torch cable 36. The feeder cable 32 is introduced to the interior of the torch cable 36 at the wire feeding device 34, and is electrically connected to the welding wire 38 at the interior of the welding torch 28. The welding power supply 30 applies welding voltage and welding current, under the control of the robot controller 24 synchronously with the operation of the mechanical section 22, through the feeder cable 32 to the welding wire 38 dispensed from the distal end of the welding torch 28.

The manipulator 26 includes a forearm (or a forearm base) 40 having a longitudinal first axis $\alpha$, a first wrist element 42 joined to the forearm 40 rotatably about the first axis $\alpha$, and a second wrist element 44 joined to the first wrist element 42 rotatably about a second axis $\beta$ extending in a direction generally perpendicular to the first axis $\alpha$. The welding torch 28 is attached through an attachment member 46 to the second wrist element 44 at a position somewhat spaced from the second axis $\beta$ and opposite to the forearm 40. A mounting substrate 48 is formed on the forearm 40, and the wire feeding device 34 is mounted on the mounting substrate 48. In this connection, depending upon the configuration of a robot (or a mechanical section), a manipulator including a forearm and a wrist element and having a different joint configuration may be provided.

The umbilical-member managing structure 20 for a welding torch, applied to the arc welding robot having the above configuration, serves for laying and managing, along the manipulator 26, a plurality of umbilical members connected to the welding torch 28 attached to the manipulator 26. The umbilical members includes a welding wire 38 to be fed to the welding torch 28, a tubular liner 50 surrounding the welding wire 38, a tube 52 for supplying an assist gas to the welding torch 28, and an electrical conductor 54 for feeding a welding current to the welding torch 28, all of which are contained in the torch cable 36 (see FIG. 4). Therefore, the torch cable 36 provides not only a feeding passage for the welding wire 38 but also passages for feeding the assist gas and the welding current.

In a case where the orientation of the welding torch 28 is changed by turning the welding torch 28 about its longitudinal axis, the torch cable 36 may be subjected to a twisting action. In order to avoid inconveniences caused by the twisting action, the umbilical-member managing structure 20 employs the torch cable 36 having a cross-sectional structure as shown in FIG. 4, and also uses a connection structure provided for at least one of a first end section 36*a* at the side of the welding torch 28 and a second end section 36*b* at the side of the wire feeding device 34, to establish a rotatable support of the torch cable 36 about the longitudinal axis thereof, as will be described later.

Moreover, in order to facilitate the smooth motion of the flexible torch cable 36 in a longitudinal direction thereof during a robot operation, it is preferred that a cable guide 56 is provided, as occasion demands, at one or more locations on the manipulator 36, the cable guide 56 movably retaining a portion of the torch cable 36 in the longitudinal and rotational directions thereof. When the cable guide 56 for stabilizing the behavior of the torch cable 36 is provided at a suitable location on the manipulator 26, it is possible to predict the behavior of the torch cable 36, and thus to prevent the torch cable 36 from showing an unstable and unpredictable behavior.

As shown in FIG. 4, the torch cable 36 constituting the umbilical-member managing structure 20 has a structure in which a tubular liner (or a conduit liner) 50 used as a passage for the welding wire 38, a tube (or a gas hose) 52 for supplying assist gas, and a multi-core cable 58 for operation use, formed by bundling a plurality of electrical conductors 54, are contained in a flexible conduit 60. Material for the conduit 60 may be selected suitably, for example, from various flexible resinous materials. In this respect, while the torch cable is wound around or otherwise is rearranged along the manipulator 26 (FIG. 3A) so as to absorb the motion of the wrist during the operation of the wrist of the arc welding robot, a stress generated in the conduit 60 is significantly reduced by adopting a tension reduction technique or a terminating rotatable connection mechanism as described later, so that it is not difficult to select a material having a practically sufficient durability.

In the torch cable 36, the tubular liner 50 surrounding the welding wire 38 is inserted into the interior of the tube 52 and is arranged substantially along the longitudinal axis of the conduit 60. In other words, a double or nested tube comprised of the tubular liner 50 and the tube 52 is disposed with a center line thereof substantially coinciding with the longitudinal axis of the conduit 60. The length of the tube 52 for the assist gas is set to be shorter than the other umbilical members in the conduit 60, so that the tube 52 is first, among the components of the torch cable 36, subjected to the bending or twisting action. With this configuration, it is possible to avoid the tension due to the bending or twisting action to be directly applied to the conduit 60.

On the other hand, the multi-core cable 58 for operation use, formed by bundling the plural electrical conductors 54, is inserted into and contained in the conduit 60 in a manner as to be separated from the tube 52 through which the tubular liner 50 is passed. Thus, the tube 52 and the multi-core cable 58 do not constitute an umbilical-member assembly in which umbilical members are integrated into a single unit as in the conventional structure as shown in FIG. 2. Instead, the multi-core cable 58 is disposed so as to extend at an eccentric position deviated from the longitudinal axis of the conduit 60 by a predetermined distance.

Thus, an umbilical member formed by incorporating the tubular liner 50 surrounding the welding wire 38 into the tube 52 for supplying assist gas, and another umbilical member comprised of the multi-core cable 58 for operation use formed by bundling the electrical conductors 54 for feeding welding current, are separately and individually inserted into the conduit tube 60, so that it is possible to reduce the diameter of each umbilical member. It is also possible to sufficiently reduce the outer diameter of the double or nested tube comprised of the tubular liner 50 and the tube 52, provided that a very thin welding wire is fed smoothly and that the flow of assist gas is not impeded. Further, it is possible to constitute the multi-core cable 58 for operation use by bundling a large number of thin electrical conductors 54, and thus to easily reduce the outer diameter of the multi-core cable 58 without losing its flexibility. In this manner, it is possible to effectively reduce the stress generated due to the bending or twisting action of the torch cable 36 during the operation of the robot (in particular, the wrist thereof), and thus to improve the life span of the torch cable 36.

Also, as already described, when the length of the tube 52 is made shorter, in the conduit 60, than the length of the multi-core cable 58 for operation use, it is possible to prevent the multi-core cable 58 from being subjected to a tension. In order to further improve the durability to the twisting action, the multi-core cable 58 may be wound helically around the assist-gas tube 52.

Also, it is possible to reduce the diameter of each umbilical member, and thus to ensure a sufficient internal space 62 of the conduit 60 without significantly decreasing the diameter of the conduit 60. Further, while each of the umbilical members can move in the interior of the conduit 60, they are covered by the conduit 60 and thereby suitably confined, so that it is possible to somewhat reduce the interference between the umbilical members and the surrounding objects.

Incidentally, the tubular liner 50, as an umbilical member for feeding the welding wire 38, is required to undergo a regular maintenance procedure, because the inner wall surface of the liner is worn by the passage of the welding wire 38 after being used for a long time. In the present embodiment, the tubular liner 50 for the welding wire 38 is separated from the operation-use multi-core cable 58, formed by bundling the welding-current electrical conductors 54, and is disposed in the conduit 60 as a separate umbilical member, so that, in the maintenance procedure of the tubular liner 50, it is required to replace only the tubular liner 50 surrounding the welding wire 38, which can reduce the maintenance cost and an operational load.

While, in the illustrated embodiment, the plural electrical conductors 54 are integrated into a single multi-core cable 58, two or more multi-core cables for operation use may be formed by grouping the plural electrical conductors 54. In this arrangement, it is possible to further reduce the diameter of each multi-core cable, and thus to further improve the life of the cable. Also, it is possible to further improve the life of the cable, by providing a plurality of stranded electrical conductors including a plurality of very fine wires and forming a multi-core cable by further bundling in a strand fashion the plural stranded electrical conductors.

Next, a support structure rotatable about a longitudinal axis, which is provided for at least one of the end section 36a of the torch cable 36 at the side of the welding torch 28 (i.e., a first connecting section 60a of the conduit 60) and the end section 36b of the torch cable 36 at the side of the wire feeding device 34 (i.e., a second connecting section 60b of the conduit 60), will be described below. In the illustrated embodiment, rotatable support structures are provided for both end sections 36a, 36b of the torch cable 36. If the rotatable support structure is provided only for either one of the end sections, the torch cable 36 is fixed at the other end section to the welding torch 28 or to the wire feeding device 34.

Figure 5A:
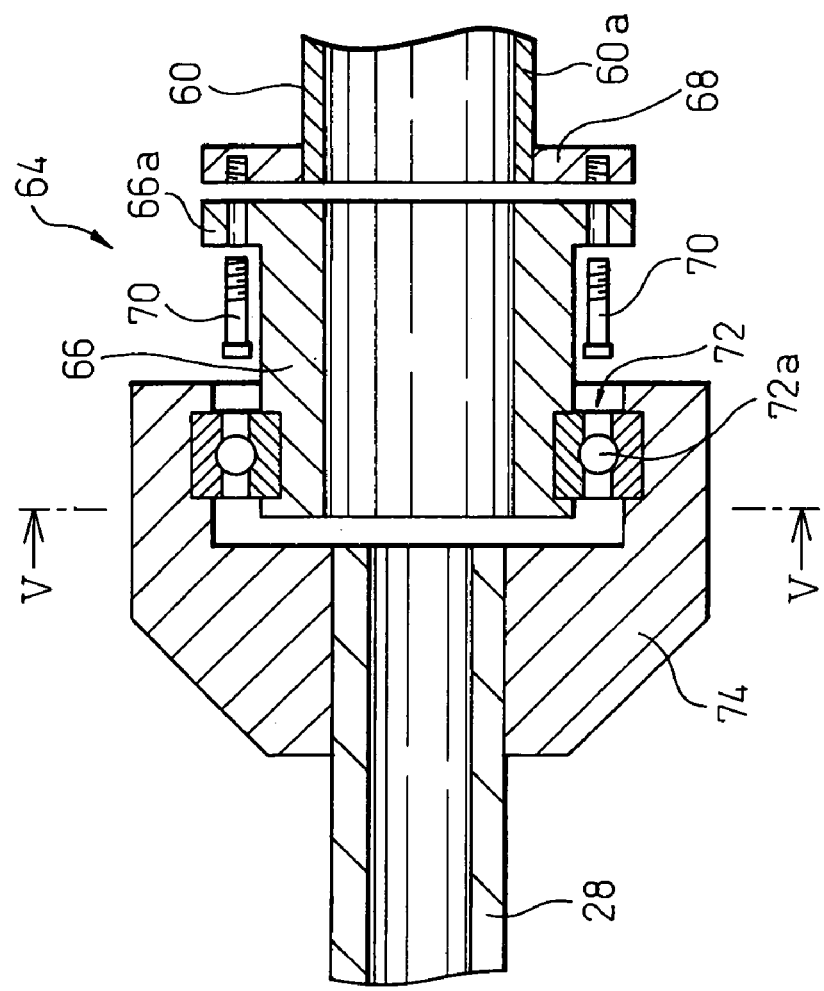
FIG. 5A is a sectional view showing a torch-cable connection mechanism provided on the side of the welding torch, in the umbilical-member managing structure of FIG. 3A.
Figure 5B:
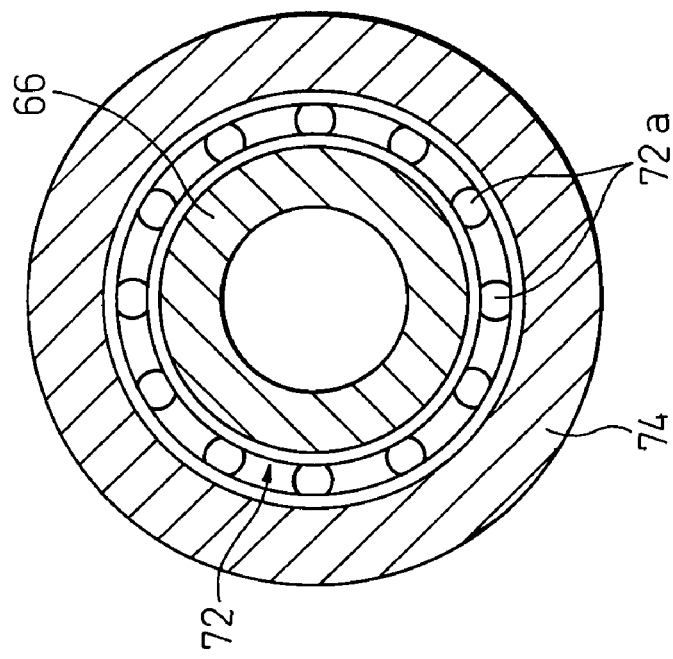
FIG. 5B is a sectional view taken along a line V—V of FIG. 5A.

FIGS. 5A and 5B show a conduit connection mechanism 64 provided for the end section 36a (FIG. 3A) of the torch cable 36 at the side of the welding torch 28. The conduit connection mechanism 64 includes a cylindrical cable holder 66 attached to the first connecting section 60a at one longitudinal end of the conduit 60. The cable holder 66 is provided at one longitudinal end thereof with a flange 66a having screw holes, and the flange 66a is detachably fastened to a flange member 68 provided at the first connecting section 60a of the conduit 60 using fastening screws 70. At the other end of the cable holder 66, a bearing unit 72 having rolling elements 72a is provided on the outer circumference of the cable holder, and a holder 74 provided on the welding torch 28 is rotatably attached through the bearing unit 72 to the cable holder 66. In this state, the welding torch 28 and the conduit 60 are disposed in a concentric correlation. In this manner, the conduit 60 is connected through the holders 66, 74 to the welding torch 28 in a condition rotatable about the longitudinal axis of the conduit 60.

Figure 6A:
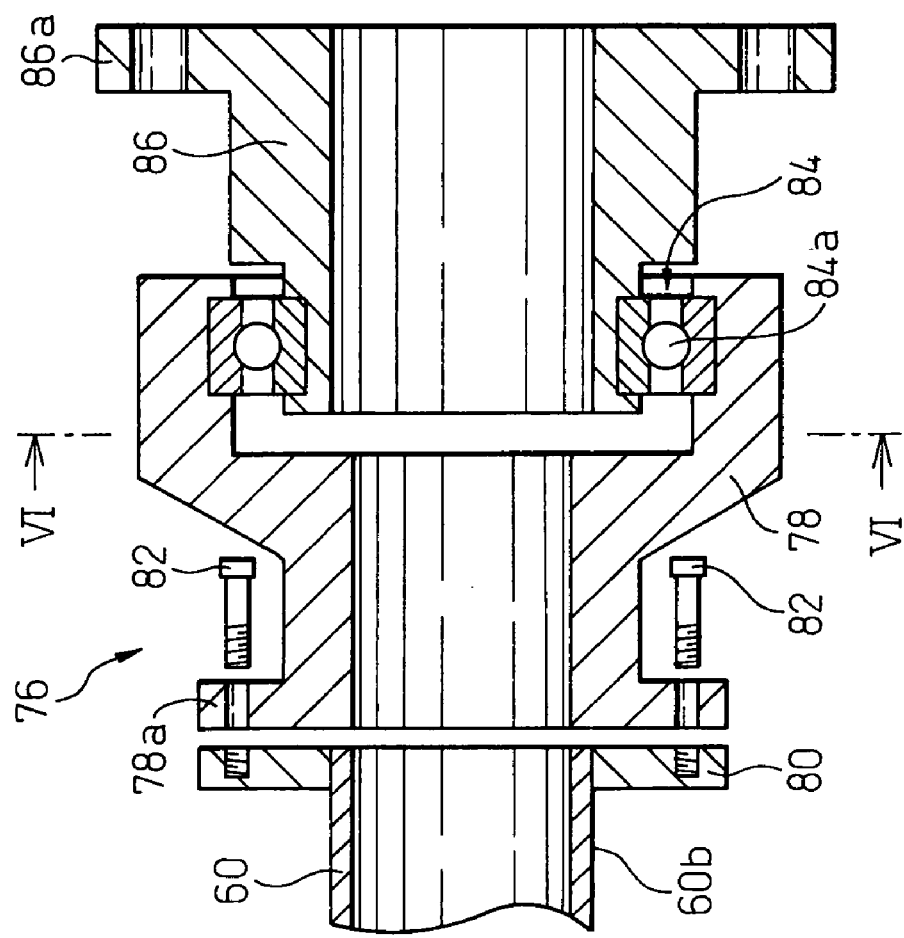
FIG. 6A is a sectional view showing a torch-cable connection mechanism on the side of the wire feeding device, in the umbilical-member managing structure of FIG. 3A.
Figure 6B:
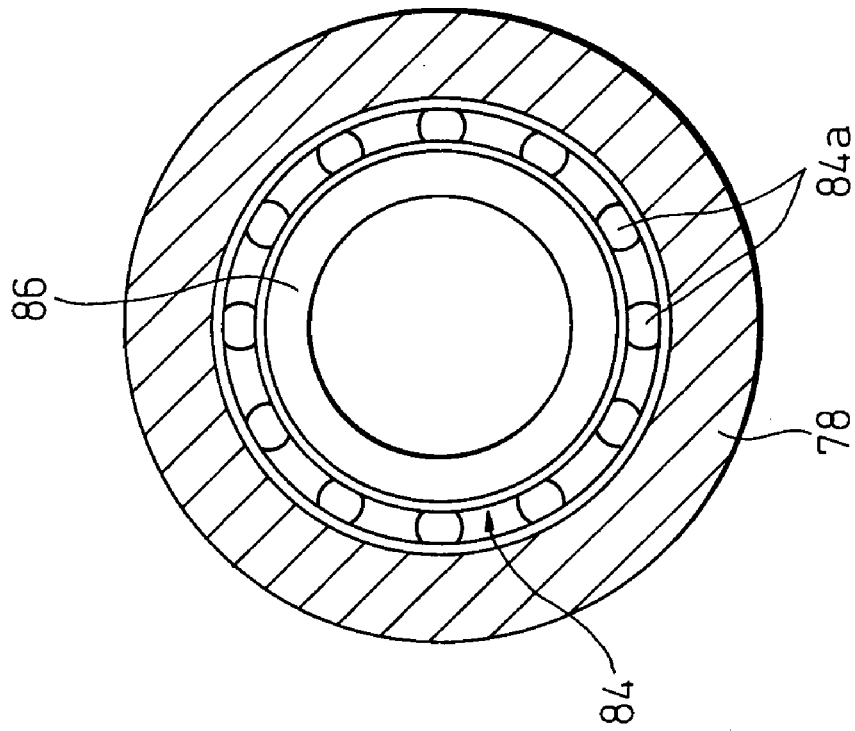
FIG. 6B is a sectional view taken along a line VI—VI of FIG. 6A.

FIGS. 6A and 6B show a conduit connection mechanism 76 provided for the end section 36b (FIG. 3A) of the torch cable 36 at the side of the wire feeding device 34. The conduit connection mechanism 76 has generally the same configuration as the above-described conduit connection mechanism 64, and includes a cylindrical cable holder 78 attached to the second connecting section 60b at another longitudinal end of the conduit 60. The cable holder 78 is provided at one longitudinal end thereof with a flange 78a having screw holes, and the flange 78a is detachably fastened to a flange member 80 provided at the second connecting section 60b of the conduit 60 using fastening screws 82.

At the other end of the cable holder 78, of which both outer and inner diameters are widened outward, a bearing unit 84 having rolling elements 84a is provided on the inner circumference of the cable holder. A holder 86 provided on the wire feeding device 34 (FIG. 3A) is rotatably attached through the bearing unit 84 to the cable holder 78. In this state, the holder 86 of the wire feeding device 34 and the conduit 60 are disposed in a concentric correlation. The holder 86 is attached to the body (not shown) of the wire feeding device 34 using a flange 86a provided at the end opposite to the bearing unit 84. In this manner, the conduit 60 is connected through the holders 78, 86 to the wire feeding device 34 in a condition rotatable about the longitudinal axis of the conduit 60.

Ensuring a rotational degree of freedom about the axis of the conduit 60 for at least one end (both ends, in the illustrated embodiment) of the conduit 60, allows most of a torsion stress generated in the conduit 60 to be relieved by the rotation of the conduit 60. Therefore, when a turning operation of the welding torch 28 is performed at the distal end of the robot wrist, it is possible to avoid the concentration of torsion stress in the conduit 60, and thereby to prevent the conduit 60 from being fatigued and broken.

The umbilical-member managing structure 20 having the above-described configuration may further include a clamp mechanism for clamping the plural umbilical members in the conduit 60 relative to the welding torch 28 and/or the wire feeding device 34. Such a clamp mechanism may be provided in association with at least one of the first connecting section 60a and the second connecting section 60b of the conduit 60.

Figure 7:
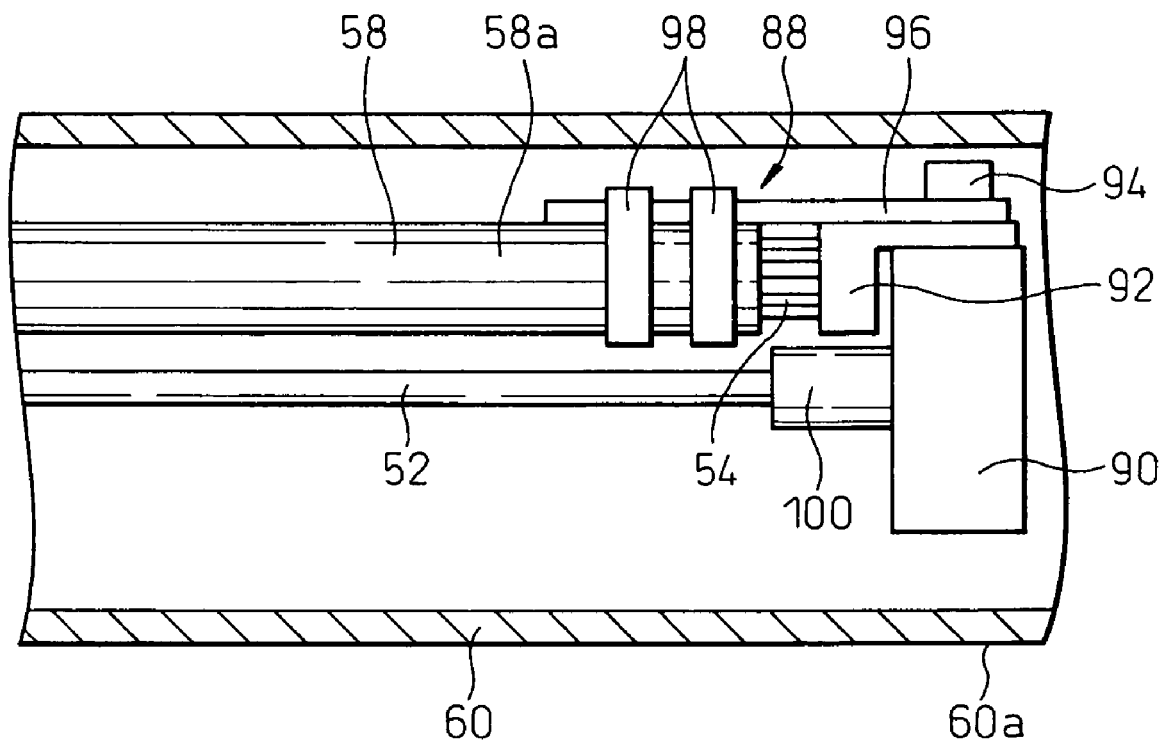
FIG. 7 is a partially cutaway view showing a clamp mechanism provided for an electrical conductor for feeding a welding current, in the umbilical-member managing structure of FIG. 3A.

FIG. 7 shows, by way of example, a clamp mechanism 88 provided at a location where the operation-use multi-core cable 58 for supplying welding current is connected to the welding torch 28. It is preferred that the multi-core cable 58 is also clamped in the same manner at a location where the multi-core cable 58 is connected to the wire feeding device 34. The sheath of the multi-core cable is stripped at opposite ends thereof where the multi-core cable 58 is connected to the welding torch 28 and to the wire feeding device 34, and the electrical conductors 54 arranged inside are connected to a counterpart member through a caulking or by using a connecting member such as a press-fitting terminal. In the example shown in FIG. 7, the sheath 58a is partially removed at one end of the multi-core cable 58, corresponding to the first connecting section 60a of the conduit 60, and the portions of the electrical conductors 54 exposed therefrom are connected to a wire press-fitting terminal 92 provided on a connecting member 90 formed on the welding torch 28 (FIG. 3A).

The clamp mechanism 88 includes a clamp plate 96 adapted to be fixed to the connecting member 90 using fastening bolts 94 and a desired number (two, in the figure) of bands 98 for holding an end length of the multi-core cable 58, which has the sheath 58a, onto the clamp plate 96 in an adjacent fashion. When securing the operation-use multi-core cable 58 at a portion of the sheath 58a thereof in this manner, it is possible to prevent the tensile and/or twisting force exerted upon the multi-core cable 58 during the operation of the robot wrist from being applied only to the connecting portion of the electrical conductors 54 to the wire press-fitting terminal 92. Also at the other connecting section of the conduit for the wire feeding device 34, a similar clamp mechanism can be provided in order to prevent a large stress from being applied to the connecting portion of the electrical conductors 54.

As illustrated, the operation-use multi-core cable 58 is disposed at the eccentric position deviated from the center of the conduit 60, and the assist-gas tube 52 passes adjacent to the center of the conduit 60. The assist-gas tube 52 is connected to a tube connecting section 100 formed on the connecting member 90. In the connecting member 90, an assist-gas passage (not shown) is formed to extend from the tube connecting section 100 to the welding torch 28 (FIG. 3A).

The provision of the clamp mechanisms for clamping the outer circumferences of the umbilical members to the counterpart connecting member at a location where the respective umbilical members passing through the conduit 60 are connected to the welding torch 28 or to the wire feeding device 34, makes it possible to reduce the influence of an external force exerted upon the umbilical members, and thus to effectually increase the life span of the umbilical members.

Incidentally, during the operation of the robot wrist, there is a case where the umbilical members arranged in the conduit 60 generate a "fluttering" motion relative to the wall of the conduit 60. Also, in a case where the conduit 60 is wound around the manipulator 26 (FIG. 3A), the umbilical members may be pressed through the wall of the conduit 60 against the manipulator 26. These phenomena may damage the umbilical members, so that it is advantageous, in order to prevent such damage, that the umbilical-member managing structure 20 having the above configuration further includes a retaining member arranged at a suitable location in the interior of the conduit 60 for retaining the plural umbilical members at a predetermined position. FIGS. 8A and 8B show, by way of example, the retaining member 102 incorporated in the structure shown in FIG. 7.

As shown in FIG. 8A, the retaining member 102 is a disc-shaped member having a suitable thickness with the outer diameter thereof being slightly smaller than the inner diameter of the conduit 60, and is provided with a plurality of through-holes 104, 106 for holding and guiding the umbilical members. The through-holes 104, 106 are formed at positions corresponding to those occupied by the objective umbilical members in a normal or non-stressed condition in the conduit 60.

In the illustrated example, the through-hole 104 formed at the center of the retaining member 102 holds and guides the assist-gas tube 52, and the through-hole 106 formed at an eccentric position deviated from the center holds and guides the sheath 58a of the operation-use multi-core cable 58. These through-holes are formed such that the inner diameter of the through-hole 104 is slightly larger than the outer diameter of the assist-gas tube 52, and the inner diameter of the through-hole 106 is slightly larger than the outer diameter of the sheath 58a of the multi-core cable 58.

As shown in FIG. 4, the tubular liner 50 providing a passage for the welding wire 38 is contained in the assist-gas tube 52, so that it is very desirable for ensuring a feeding stability of the welding wire 38 that the assist-gas tube 52 is retained to be substantially aligned with the longitudinal axis of the conduit 60 in this manner. In addition, the retaining member 102 acts to prevent the "fluttering" of the assist-gas tube 52 in the conduit 60, which further improves the feeding stability of the welding wire 38.

In this connection, it is preferred that a nylon band 108 is wound around the assist-gas tube 52 near the opposite opening ends of the through-hole 104, so as to suppress the fluctuation of the retaining member 102 in the longitudinal direction of the conduit 60. Also, it is desirable to use a material having a self-lubricating property (e.g., Teflon®) as the material of the retaining member 102, so as to enable the umbilical members to pass smoothly through the through-holes 104, 106.

As is apparent from the foregoing description, in accordance with the present invention, the flexible conduit is used for containing the welding-wire liner, the assist-gas tube and the welding-current electrical conductors, and a rotational degree of freedom about the longitudinal axis of the conduit is ensured for at least one end of the conduit, so that it is possible to easily eliminate a stress generating due to the bending and twisting action of the conduit, during the operation of the manipulator (in particular, the turning operation of the welding torch).

In this connection, although the umbilical members extending in the conduit may be twisted due to the turning operation of the welding torch, the welding-current electrical conductors are disposed in the conduit in a condition as to be separated from the welding-wire liner and the assist-gas tube, so that the mutual influence between the motion of the electrical conductors and the motion of the welding-wire liner and assist-gas tube is substantially eliminated and, therefore, the stress due to the bending and twisting action can be reduced. In addition, in a case where the welding-current conductors are broken and/or the welding wire liner is worn and damaged, it is required to replace only one of these umbilical members, which makes the cost of maintenance lower.

Thus, according to the present invention, it is possible to effectively prevent the life span of a torch cable containing a plurality of umbilical members, such as a welding-wire liner, an assist-gas tube and welding-current electrical conductors, from being shortened. Also, it is possible to easily arrange a torch cable in close proximity to a robot forearm or wrist in a manner as to avoid the interference between the torch cable and a workpiece to be welded or jigs.

While the invention has been described with reference to specific preferred embodiments, it will be understood by those skilled in the art that various changes and modifications may be made thereto without departing from the spirit and scope of the following claims.

The invention claimed is:

1. An umbilical-member managing structure for a welding torch provided in an arc welding robot, for laying and managing, along a manipulator, a plurality of umbilical members connected to a welding torch attached to said manipulator;

wherein said plurality of umbilical members include a welding wire to be fed to said welding torch, a tubular liner surrounding said welding wire, a tube for supplying an assist gas to said welding torch, and a plurality of electrical conductors for feeding a welding current to said welding torch;

wherein said arc welding robot is provided with a wire feeding device mounted on said manipulator for feeding said welding wire to said welding torch;

wherein said umbilical-member managing structure comprises:

a flexible conduit containing said plurality of umbilical members, said flexible conduit including a first connecting section provided at one longitudinal end to be connected to said welding torch, and a second connecting section provided at another longitudinal end to be connected to said wire feeding device; and a connection mechanism provided for at least one of said first and second connecting sections of said conduit, said connection mechanism connecting said conduit in a rotatable manner to at least one of said welding torch and said wire feeding device;

wherein said plurality of electrical conductors are integrated into a multi-core cable; and wherein, in said flexible conduit, said multi-core cable is separated from both of said tubular liner for welding wire and said tube for assist gas.

2. An umbilical-member managing structure as set forth in claim 1, further comprising a clamp mechanism provided in association with at least one of said first and second connecting sections of said conduit, said clamp mechanism clamping said plurality of umbilical members relative to at least one of said welding torch and said wire feeding device.

3. An umbilical-member managing structure as set forth in claim 1, further comprising a retaining member provided in an interior of said conduit, said retaining member retaining said plurality of umbilical members at a predetermined position.

* * * * *